US010676835B2

(12) United States Patent
Kotani et al.

(10) Patent No.: US 10,676,835 B2
(45) Date of Patent: Jun. 9, 2020

(54) TIN-PLATED PRODUCT AND METHOD FOR PRODUCING SAME

(71) Applicants: Dowa Metaltech Co., Ltd., Tokyo (JP); Yazaki Corporation, Tokyo (JP)

(72) Inventors: Hirotaka Kotani, Tokyo (JP); Hiroto Narieda, Tokyo (JP); Hideki Endo, Tokyo (JP); Akira Sugawara, Tokyo (JP); Yuta Sonoda, Tokyo (JP); Takaya Kondo, Shizuoka (JP); Jyun Toyoizumi, Shizuoka (JP); Yuya Kishibata, Shizuoka (JP)

(73) Assignees: Dowa Metaltech Co., Ltd., Tokyo (JP); Yazaki Corporation, Tokyo (JP)

( * ) Notice: Subject to any disclaimer, the term of this patent is extended or adjusted under 35 U.S.C. 154(b) by 0 days.

(21) Appl. No.: 15/564,538

(22) PCT Filed: Apr. 20, 2016

(86) PCT No.: PCT/JP2016/002103
§ 371 (c)(1),
(2) Date: Oct. 5, 2017

(87) PCT Pub. No.: WO2016/178305
PCT Pub. Date: Nov. 10, 2016

(65) Prior Publication Data

US 2018/0080135 A1 Mar. 22, 2018

(30) Foreign Application Priority Data

May 7, 2015 (JP) ................................ 2015-094832

(51) Int. Cl.
*B32B 15/00* (2006.01)
*C25D 3/60* (2006.01)
(Continued)

(52) U.S. Cl.
CPC ................ *C25D 3/60* (2013.01); *C25D 5/10* (2013.01); *C25D 5/12* (2013.01); *H01R 13/03* (2013.01);
(Continued)

(58) Field of Classification Search
None
See application file for complete search history.

(56) References Cited

U.S. PATENT DOCUMENTS 4,645,360 A * 2/1987 Eastwood .............. F16C 33/12 29/898.14
2003/0003320 A1* 1/2003 Matsuo .................. B32B 15/01 428/647
(Continued)

FOREIGN PATENT DOCUMENTS

EP 1001054 A2 5/2000
JP 2000026994 A 1/2000
(Continued)

OTHER PUBLICATIONS

International search report for patent application No. PCT/JP2016/002103 dated May 19, 2016.
European search report for patent application No. 16789444.3-1103/3293291 dated Oct. 19, 2018.

*Primary Examiner* — Seth Dumbris
(74) *Attorney, Agent, or Firm* — Bachman & LaPointe, PC

(57) ABSTRACT

There is provided a tin-plated product having an excellent minute sliding abrasion resistance property when it is used as the material of insertable and extractable connecting terminals, and a method for producing the same. After a nickel layer 16 is formed on a substrate 10 of copper or a copper alloy so as to have a thickness of 0.1 to 1.5 μm by electroplating, a tin-copper plating layer 12 containing tin **12*b* mixed with a copper-tin alloy 12*a*** is formed thereon so
(Continued)

as to have a thickness of 0.6 to 10 μm by electroplating using a tin-copper plating bath which contains 5 to 35% by weight of copper with respect to the total amount of tin and copper, and then, a tin layer 14 is formed thereon so as to have a thickness of 1 μm or less by electroplating if necessary.

5 Claims, 5 Drawing Sheets

(51) Int. Cl.

| | |
|---|---|
| ***C25D 5/10*** | (2006.01) |
| ***C25D 5/12*** | (2006.01) |
| ***H01R 13/03*** | (2006.01) |
| *C25D 7/00* | (2006.01) |
| *C25D 3/58* | (2006.01) |
| *C25D 3/38* | (2006.01) |
| *C25D 3/12* | (2006.01) |
| *C25D 3/30* | (2006.01) |

(52) U.S. Cl.

CPC ................. *C25D 3/12* (2013.01); *C25D 3/30* (2013.01); *C25D 3/38* (2013.01); *C25D 3/58* (2013.01); *C25D 7/00* (2013.01); *H01R 2201/26* (2013.01); *Y10T 428/12694* (2015.01)

(56) References Cited

U.S. PATENT DOCUMENTS

| | | | | |
|---|---|---|---|---|
| 2009/0212427 | A1* | 8/2009 | Mis | H01L 21/2885 257/737 |
| 2011/0042815 | A1* | 2/2011 | Ikeda | H01L 23/488 257/762 |
| 2012/0107639 | A1* | 5/2012 | Takamizawa | C25D 5/10 428/620 |
| 2013/0196171 | A1* | 8/2013 | Taninouchi | C25D 3/12 428/553 |
| 2015/0219154 | A1* | 8/2015 | Gaertner | F16C 33/122 384/276 |

FOREIGN PATENT DOCUMENTS

| | | | | |
|---|---|---|---|---|
| JP | 2002080993 | A | 3/2002 | |
| JP | 2003293187 | A | 10/2003 | |
| JP | 2004091882 | A | 3/2004 | |
| JP | 2004220871 | A | 8/2004 | |
| JP | 2006183068 | A | 7/2006 | |
| JP | 2006265616 | A | 10/2006 | |
| JP | 2009046745 | A | 3/2009 | |
| JP | 2010090433 | * | 4/2010 | C25D 5/12 |
| JP | 2010248616 | A | 11/2010 | |

* cited by examiner

TIN-PLATED PRODUCT AND METHOD FOR PRODUCING SAME

TECHNICAL FIELD

The present invention relates generally to a tin-plated product and a method for producing the same. More specifically, the invention relates to a tin-plated product used as the material of an insertable and extractable connecting terminal or the like, and a method for producing the same.

BACKGROUND ART

As conventional materials of insertable and extractable connecting terminals, there are used tin-plated products wherein a tin plating film is formed as the outermost layer of a conductive material, such as copper or a copper alloy. In particular, tin-plated products are used as the materials of information communication equipment for automotive vehicles, portable telephones and personal computers, control substrates for industrial equipment, such as robots, terminals, such as connectors, lead frames, relays and switches, and bus bars, from the points of view of their small contact resistance, contact reliability, corrosion resistance, solderability, economy and so forth.

As a method for producing such a tin-plated product, there is proposed a method for producing a plated copper or copper alloy wherein a nickel or nickel alloy layer is formed on the surface of copper or a copper alloy, and a tin or tin alloy layer is formed on the outermost surface side thereof, at least one layer of intermediate layers containing copper and tin as main components or intermediate layers containing copper, nickel and tin as main components being formed between the nickel or nickel alloy layer and the tin or tin alloy layer, and at least one intermediate layer of these intermediate layers containing a layer which contains 50% by weight or less of copper and 20% by weight or less of nickel, the method comprising the steps of: forming a plating film of nickel or a nickel alloy having a thickness of 0.05 to 1.0 μm on the surface of copper or the copper alloy; forming a plating film of copper having a thickness of 0.03 to 1.0 μm thereon; forming a plating film of tin or a tin alloy having a thickness of 0.15 to 3.0 μm on the outermost surface; and then, carrying out a heating treatment at least once (see, e.g., Patent Document 1).

There is also proposed a conductive material for connecting parts, wherein a copper-tin alloy coating layer, which contains 20 to 70% by atom of copper and which has an average thickness of 0.2 to 3.0 μm, and a tin coating layer, which has an average thickness of 0.2 to 5.0 μm, are formed on the surface of a base material of a copper plate or bar in this order, and the surface thereof is reflow-treated, the arithmetic average roughness Ra in at least one direction being 0.15 μm or more, the arithmetic average roughness Ra in all directions being 3.0 μm or less, a part of the copper-tin alloy coating layer being exposed to the surface of the tin coating layer, and the exposed area ratio of the copper-tin alloy coating layer being 3 to 75% with respect to the surface of the conductive material (see, e.g., Patent Document 2).

PRIOR ART DOCUMENT(S)

Patent Document(s)

Patent Document 1: Japanese Patent Laid-Open No. 2003-293187 (Paragraph Numbers 0016-0019)

Patent Document 2: Japanese Patent Laid-Open No. 2006-183068 (Paragraph Number 0014)

SUMMARY OF THE INVENTION

Problem to be Solved by the Invention

In the tin-plated products proposed in Patent Documents 1 and 2, the tin-copper plating layer is formed on the whole surface of the undersurface of the outermost layer (the tin or tin alloy layer) by a reflow treatment (heating treatment). If such a tin-plated product is used as the material of terminals for automotive vehicles, tin (or the tin alloy) on the outermost layer is worn away (minute sliding abrasion (fretting corrosion) due to minute sliding) by sliding for a slight distance (of about 50 μm) between contact points of male and female terminals due to vibrations during vehicle travel, so that the oxide of abrasion powder produced by the minute sliding abrasion exists between the contact points to easily raise the resistance value of the terminals.

It is therefore an object of the present invention to eliminate the aforementioned problems and to provide a tin-plated product which has an excellent minute sliding abrasion resistance property when it is used as the material of insertable and extractable connecting terminals or the like, and a method for producing the same.

Means for Solving the Problem

In order to accomplish the aforementioned object, the inventors have diligently studied and found that it is possible to produce a tin-plated product which has an excellent minute sliding abrasion resistance property when it is used as the material of insertable and extractable connecting terminals or the like, if a tin-copper plating layer, which contains tin mixed with a copper-tin alloy, is formed on a substrate of copper or a copper alloy by electroplating using a tin-copper plating bath. Thus, the inventors have made the present invention.

According to the present invention, there is provided a method for producing a tin-plated product, the method comprising the steps of: preparing a tin-copper plating bath; and forming a tin-copper plating layer, which contains tin mixed with a copper-tin alloy, on a substrate of copper or a copper alloy by electroplating using the tin-copper plating bath.

In this method for producing a tin-plated product, the tin-copper plating bath preferably contains 5 to 35% by weight of copper with respect to the total amount of tin and copper, and the electroplating is preferably carried out so that the tin-copper plating layer has a thickness of 0.6 to 10 μm. After the tin-copper plating layer is formed, a tin layer may be formed by electroplating. In this case, the electroplating for forming the tin layer is preferably carried out so that the tin layer has a thickness of 1 μm or less. Before the tin-copper plating layer is formed, a nickel layer may be formed by electroplating. In this case, the electroplating for forming the nickel layer is preferably carried out so that the nickel layer has a thickness of 0.1 to 1.5 μm. The copper-tin alloy is preferably $Cu_6Sn_5$.

According to the present invention, there is provided a tin-plated product comprising: a substrate of copper or a copper alloy; and a tin-copper plating layer formed on the substrate, the tin-copper plating layer containing tin mixed with a copper-tin alloy, and the tin-copper plating layer having a thickness of 0.6 to 10 μm, wherein the content of copper in the tin-copper plating layer is 5 to 35% by weight.

In this tin-plated product, a tin layer having a thickness of 1 μm or less is preferably formed on the tin-copper plating layer, and a nickel layer having a thickness of 0.1 to 1.5 μm is preferably formed between the substrate and the tin-copper plating layer. The copper-tin alloy is preferably $Cu_6Sn_5$.

Effects of the Invention

According to the present invention, it is possible to produce a tin-plated product which has an excellent minute sliding abrasion resistance property when it is used as the material of insertable and extractable connecting terminals or the like.

MODE FOR CARRYING OUT THE INVENTION

Referring to the accompanying drawings, the preferred embodiment of a tin-plated product according to the present invention will be described below in detail.

Figure 1A:
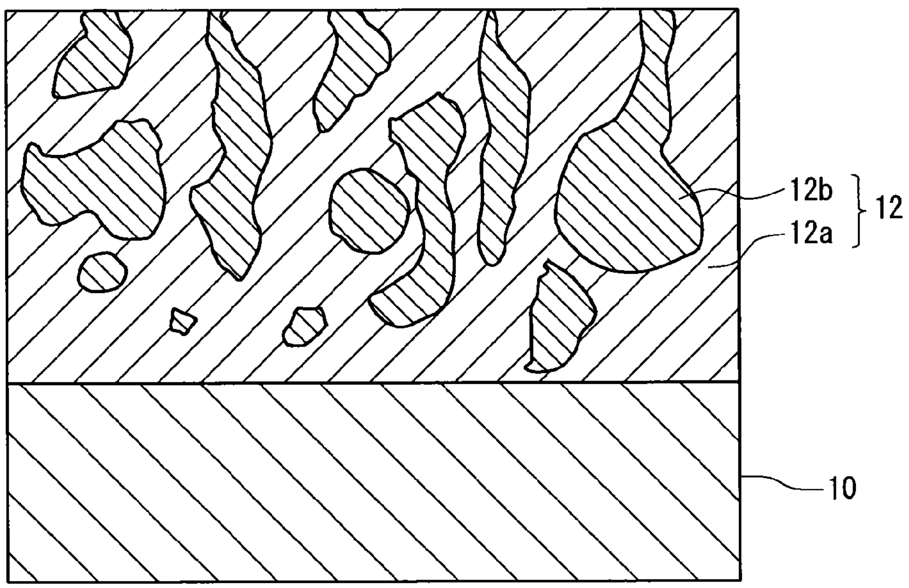
FIG. 1A is a sectional view showing a preferred embodiment of a tin-plated product according to the present invention.
Figure 1B:
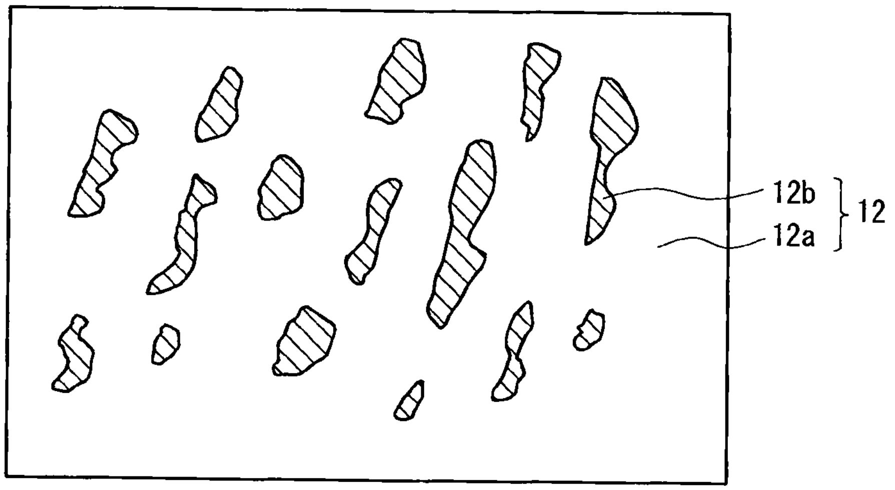
FIG. 1B is a plan view of the tin-plated product of FIG. 1A.

As shown in FIGS. 1A and 1B, in a preferred embodiment of a tin-plated product according to the present invention, a tin-copper plating layer 12 containing tin 12*b* mixed with a copper-tin alloy 12*a* is formed on a substrate 10 of copper or a copper alloy. The thickness of the tin-copper plating layer 12 is 0.6 to 10 μm, and preferably 1 to 5 μm. If the thickness of the tin-copper plating layer 12 is less than 0.6 μm, the substrate is easily exposed by minute sliding abrasion (fretting corrosion) to deteriorate the minute sliding abrasion resistance property of the tin-plated product. On the other hand, even if the thickness of the tin-copper plating layer 12 exceeds 10 μm, it does not contribute to the further improvement of the minute sliding abrasion resistance property, although the producing costs of the tin-plated product are increased. The content of copper in the tin-copper plating layer 12 is 5 to 35% by weight, and preferably 10 to 30% by weight. If the content of copper is less than 5% by weight, the content of tin is too great, so that the minute sliding abrasion of the tin-plated product is easily caused to deteriorate the minute sliding abrasion property. On the other hand, if the content of copper exceeds 30% by weight, the content of copper is too great, so that the electrical resistance value is increased to deteriorate the minute sliding abrasion property.

Figure 2:
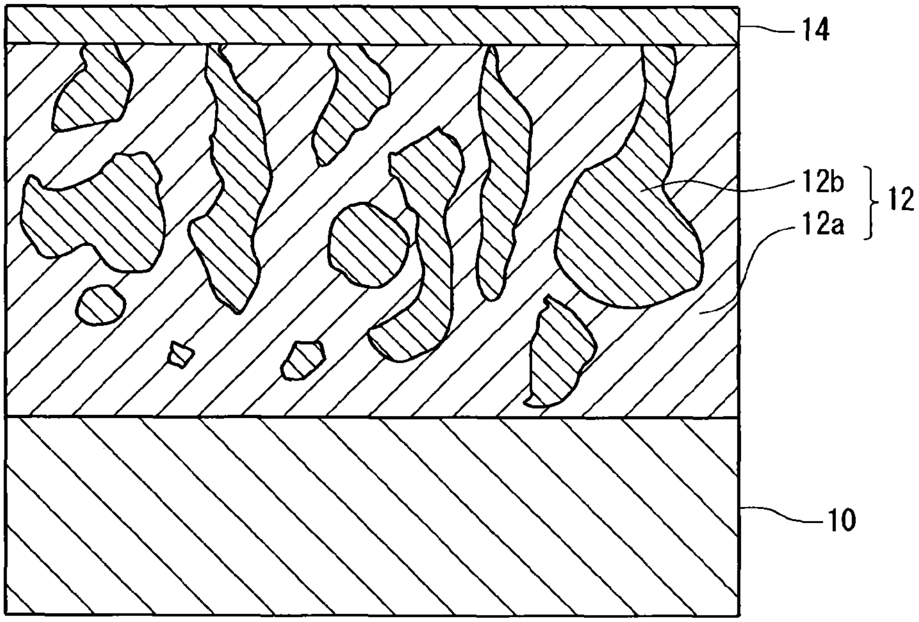
FIG. 2 is a sectional view showing another preferred embodiment of a tin-plated product according to the present invention.
Figure 3:
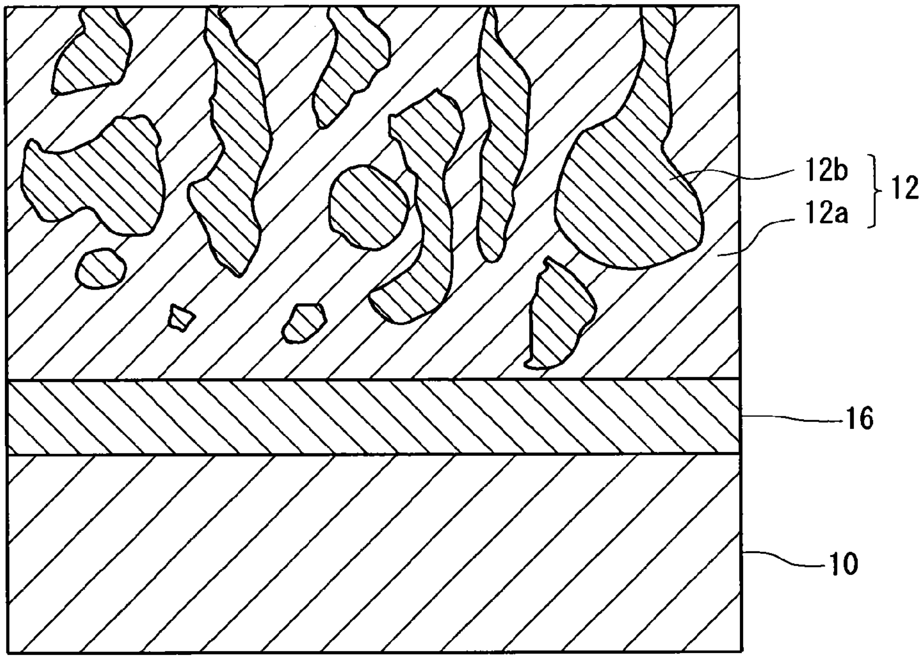
FIG. 3 is a sectional view showing a further preferred embodiment of a tin-plated product according to the present invention.
Figure 4:
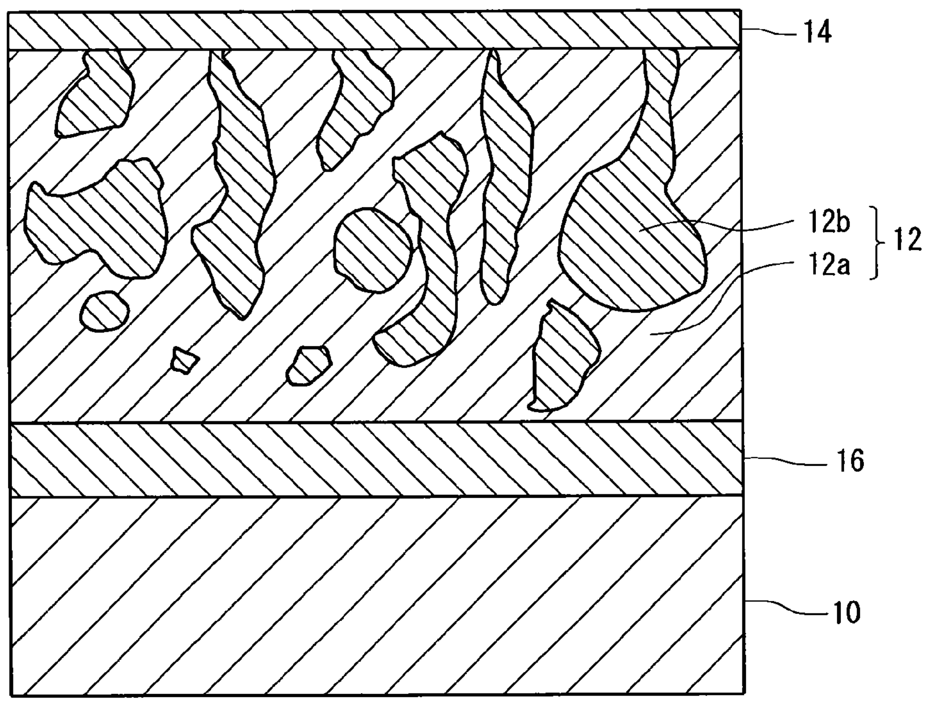
FIG. 4 is a sectional view showing a still further preferred embodiment of a tin-plated product according to the present invention.

As shown in FIG. 2 as another preferred embodiment of a tin-plated product according to the present invention, a tin layer 14 may be formed on the tin-copper plating layer 12 as the outermost layer. In this case, the thickness of the tin layer 14 is preferably 1 μm or less, and more preferably 0.7 μm or less, since the minute sliding abrasion property of the tin-plated product is deteriorated if the thickness of the tin layer 14 exceeds 1 μm. As shown in FIG. 3, a nickel layer 16 may be formed between the substrate 10 and the tin-copper plating layer 12 as an underlying layer. In this case, the thickness of the nickel layer 16 is preferably 0.1 to 1.5 μm, and more preferably 0.3 to 1.0 μm. If the nickel layer 16 has a thickness of not less than 0.1 μm, it is possible to improve the contact reliability of the tin-plated product after being allowed to stand at a high temperature. On the other hand, if the thickness of the nickel layer 16 exceeds 1.5 μm, the bending workability of the tin-plated product is deteriorated. As shown in FIG. 4, both of the tin layer 14 and the nickel layer 16 may be formed. Furthermore, the copper-tin alloy is preferably $Cu_6Sn_5$. If the copper-tin alloy is $Cu_3Sn$, the hardness of the tin-plated product is increased to deteriorate the bending workability thereof.

In the preferred embodiment of a method for producing a tin-plated product according to the present invention, a tin-copper plating layer, which contains tin mixed with a copper-tin alloy, is formed on a substrate of copper or a copper alloy by electroplating using a tin-copper plating bath. Even if a tin-plated product having such a tin-copper plating layer is used as the material of a male and/or female terminal of a connecting terminal for automotive vehicles, it is considered that the amount of the oxide of abrasion powder, which is produced by minute sliding producible between the male and female terminals in a state that the male terminal is fitted into and fixed to the female terminal, is small, and that the produced oxide of abrasion powder is easily raked out by the minute sliding to a portion other than the contact points of the male and female terminals so that it is difficult to raise the resistance value of the terminals.

In this method for producing a tin-plated product, the tin-copper plating bath preferably contains 5 to 35% by weight of copper with respect to the total amount of tin and copper. As this tin-copper plating bath, there is preferably used a plating solution containing alkyl sulfonic acid (e.g., METASU AM, METASU SM-2, METASU Cu, METASU FCB-71A, METASU FCT-71B or the like, produced by YUKEN INDUSTRY CO., LTD.). The electroplating is carried out so that the thickness of the tin-copper plating layer is preferably 0.6 to 10 μm, and more preferably 0.8 to 5 μm. The electroplating is preferably carried out at a current density of 10 to 30 $A/dm^2$, and more preferably carried out at a current density of 10 to 20 $a/dm^2$.

After the tin-copper plating layer is formed, a tin layer may be formed by electroplating. In this case, the electroplating for forming the tin layer is preferably carried out so that the tin layer has a thickness of 1 μm or less.

Before the tin-copper plating layer is formed, a nickel layer may be formed by electroplating. In this case, the electroplating for forming the nickel layer is preferably carried out so that the nickel layer has a thickness of 0.1 to 1.5 μm.

Furthermore, the proportion of tin 12*b* to the copper-tin alloy 12*b* in the tin-copper plating layer 12 of the tin-plated product is varied by the content of copper in the tin-copper plating bath, by the formation of the nickel layer 16 as the underlying layer and/or by the formation of the tin layer 14 as the outermost layer. The amount of the copper-tin alloy 12*a* may be larger than that of tin 12*b*. Alternatively, the amount of tin 12*b* may be larger than that of the copper-tin alloy 12*a*.

EXAMPLES

Examples of a tin-plated product and a method for producing the same according to the present invention will be described below in detail.

Example 1

First, there was prepared a conductive substrate plate of a Cu—Ni—Sn—P alloy (a substrate of a copper alloy comprising 1.0% by weight of nickel, 0.9% by weight of tin, 0.05% by weight of phosphorus and the balance being copper) (NB-109EH produced by DOWA METALTECH CO., LTD.) having a size of 120 mm×50 mm×0.25 mm.

Then, as a pretreatment, the substrate (a material to be plated) was electrolytic-degreased for 20 seconds with an alkali electrolytic-degreasing solution, and then, washed with water for 5 seconds. Thereafter, the substrate was immersed in 4% by weight of sulfuric acid for 5 seconds to be pickled, and then, washed with water for 5 seconds.

Then, the pretreated substrate (the material to be plated) and a tin electrode plate were used as a cathode and an anode, respectively, to electroplate the substrate at a current density of 12 A/$dm^2$ and a liquid temperature of 25° C. for 23 seconds in a tin-copper plating solution containing 45 g/L of tin and 5 g/L of copper (the content of copper with respect to the total amount of tin and copper being 10% by weight) (1000 mL of a plating solution containing 120 mL of METASU AM, 225 mL of METASU SM-2, 50 mL of METASU CU, 100 mL of METASU FCB-71A and 20 mL of METASU FCB-71B, produced by YUKEN INDUSTRY CO., LTD., and the balance being pure water) so as to form a tin-copper plating layer having a thickness of 1 μm in a region of about 50 mm×50 mm on the substrate. Then, the substrate having the tin-copper plating layer was washed with water, and then, dried.

The outermost layer formed on the outermost surface of the tin-plated product thus produced was analyzed by electron probe microanalysis (EPMA) using an electron probe microanalyzer (JXA8100 produced by JEOL Ltd.), and analyzed by Auger electron spectroscopy (AES) using an Auger electron spectrophotometer (JAMP-7100-E produced by JEOL Ltd.). As a result, it was confirmed that the outermost layer was composed of Sn and $Cu_6Sn_5$ (copper-tin alloy) and was a tin-copper plating layer containing tin mixed with a copper-tin alloy.

After carbon (C) was deposited on the outermost surface of the tin-plated product so as to have a thickness of about 1 μm, the tin-plated product was cut by a focused ion beam (FIB) using a focused ion beam (FIB) processing-observing device (JIB-4000 produced by JEOL Ltd.) to expose a cross-section perpendicular to the rolling direction of the tin-plated product. Then, the exposed cross-section was observed at a magnification of 5,000 by means of a scanning ion microscope (SIM) (attached to the FIB processing-observing device). As a result, it was also confirmed from the SIM image of the cross-section of the tin-plated product that the outermost layer was a tin-copper plating layer containing tin mixed with a copper-tin alloy. The thickness of the tin-copper plating layer was measured from the SIM image of the cross-section of the tin-plated product. As a result, the thickness of the tin-copper plating layer was 1.1 μm.

Then, the content of copper in the tin-copper plating layer was measured by semi-quantitative analysis using a scanning electron microscope (SEM) and EPMA. As a result, the content of copper was 11.6% by weight.

Then, one of two test pieces cut off from the tin-plated product was used as a plate test piece (a test piece serving as a male terminal), and the other test piece was indented (embossed in semi-spherical shape of R=1 mm) to be used as an indented test piece (a test piece serving as a female terminal). The plate test piece was fixed on the stage of an electrical minute sliding wear testing apparatus, and the indent of the indented test piece was caused to contact the plate test piece. Then, there was carried out a sliding test wherein the stage fixing thereon the plate test piece was reciprocally slid at a sliding speed of one reciprocation per one second in a range of one way of 50 μm in horizontal directions while the indented test piece was pressed against the surface of the plate test piece at a load of 0.7 N. As a result, the substrate of each of the test pieces was not exposed even if the plate test piece was slid 100 reciprocating times or more. When the plate test piece was slid 100 reciprocating times, the electrical resistance value at the contact point of the plate test piece with the indented test piece was measured by the four-terminal method. As a result, the electrical resistance value of the tin-plated product was a low value of 2 mΩ. Furthermore, the electrical resistance value measured by the same method before the sliding test was 2 mΩ.

Example 2

A tin-plated product was produced by the same method as that in Example 1, except that a tin-copper plating solution containing 45 g/L of tin and 11.3 g/L of copper (the content of copper with respect to the total amount of tin and copper being 20% by weight) (1000 mL of a plating solution containing 120 mL of METASU AM, 225 mL of METASU SM-2, 113 mL of METASU CU, 100 mL of METASU FCB-71A and 20 mL of METASU FCB-71B, produced by YUKEN INDUSTRY CO., LTD., and the balance being pure water) was used as the tin-copper plating solution.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 1.1 μm. The content of copper in the tin-copper plating layer was measured by the same method as that in Example 1. As a result, the content of copper in the tin-copper plating layer was 23.9% by weight. The same sliding test as that in Example 1 was carried out. As a result, the substrate of each of the test pieces was not exposed even if the plate piece was slid 100 reciprocating times or more. The electrical resistance value of the tin-plated product was measured by the same method as that in Example 1 when the test piece was slid 100 reciprocating times. As a result, the electrical resistance value of the tin-plated product was a low value of 2 mΩ. Furthermore, the electrical resistance value measured by the same method before the sliding test was 15 mΩ.

In order to evaluate the contact reliability of the tin-plated product after being allowed to stand at a high temperature, test pieces cut off from the tin-plated product were taken out of a constant temperature oven after there was carried out a heat resistance test wherein the test pieces were held at 120° C. for 120 hours in the constant temperature oven under the atmosphere, and then, the same sliding test as that in Example 1 was carried out. As a result, the substrate of one of the test pieces was exposed when the test piece was slid 51 reciprocating times. The electrical resistance value was measured by the same method as that in Example 1 when the test piece was exposed (when the test piece was slid 51 reciprocating times). As a result, the electrical resistance value was 190 mΩ. Furthermore, the electrical resistance value measured by the same method before the sliding test was 200 mΩ.

Example 3

A tin-plated product was produced by the same method as that in Example 1, except that a tin-copper plating solution containing 45 g/L of tin and 19 g/L of copper (the content of copper with respect to the total amount of tin and copper being 30% by weight) (1000 mL of a plating solution containing 120 mL of METASU AM, 225 mL of METASU SM-2, 190 mL of METASU CU, 100 mL of METASU FCB-71A and 20 mL of METASU FCB-71B, produced by YUKEN INDUSTRY CO., LTD., and the balance being pure water) was used as the tin-copper plating solution.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 1.2 μm. The content of copper in the tin-copper plating layer was measured by the same method as that in Example 1. As a result, the content of copper in the tin-copper plating layer was 31.1% by weight. The same sliding test as that in Example 1 was carried out. As a result, the substrate of each of the test pieces was not exposed even if the plate test piece was slid 100 reciprocating times or more. The electrical resistance value of the tin-plated product was measured by the same method as that in Example 1 when the test piece was slid 100 reciprocating times. As a result, the electrical resistance value of the tin-plated product was a low value of 4 mΩ. Furthermore, the electrical resistance value measured by the same method before the sliding test was 93 mΩ.

Example 4

A tin-plated product was produced by the same method as that in Example 1, except that, before the tin-copper plating layer was formed, the pretreated substrate (the material to be plated) and a nickel electrode plate were used as a cathode and an anode, respectively, to electroplate the substrate at a current density of 4 A/dm$^2$ and a liquid temperature of 50° C. for 50 seconds in a nickel plating solution containing 80 g/L of nickel sulfamate and 45 g/L of boric acid so as to form a nickel plating layer having a thickness of 0.3 μm on the substrate, and then, washed with water and dried.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 1.0 μm. The underlying layer formed on the surface of the substrate of the tin-plated product was analyzed by the same method as the method for analyzing the composition of the outermost layer in Example 1. As a result, the underlying layer was formed of nickel, and the thickness of the underlying layer was 0.3 μm. The same sliding test as that in Example 1 was carried out. As a result, the substrate of each of the test pieces was not exposed even if the plate test piece was slid 100 reciprocating times or more. The electrical resistance value of the tin-plated product was measured by the same method as that in Example 1 when the test piece was slid 100 reciprocating times. As a result, the electrical resistance value of the tin-plated product was a low value of 2 mΩ. Furthermore, the electrical resistance value measured by the same method before the sliding test was 2 mΩ.

Example 5

A tin-plated product was produced by the same method as that in Example 4, except that the same tin-copper plating solution as that in Example 2 was used.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 1.2 μm. The underlying layer formed on the surface of the substrate of the tin-plated product was analyzed by the same method as that in Example 4. As a result, the underlying layer was formed of nickel, and the thickness of the underlying layer was 0.3 μm. The same sliding test as that in Example 1 was carried out. As a result, the substrate of each of the test pieces was not exposed even if the plate test piece was slid 100 reciprocating times or more. The electrical resistance value of the tin-plated product was measured by the same method as that in Example 1 when the test piece was slid 100 reciprocating times. As a result, the electrical resistance value of the tin-plated product was a low value of 3 mΩ. Furthermore, the electrical resistance value measured by the same method before the sliding test was 7 mΩ.

After the same heat resistance test as that in Example 2 was carried out, the same sliding test as that in Example 1 was carried out. As a result, the substrate of each of the test pieces was not exposed even if the test piece was slid 100 reciprocating times or more. The electrical resistance value was measured by the same method as that in Example 1 when the test piece was slid 100 reciprocating times. As a result, the electrical resistance value was a low value of 8 mΩ. Furthermore, the electrical resistance value measured by the same method before the sliding test was 5 mΩ.

Example 6

A tin-plated product was produced by the same method as that in Example 4, except that the same tin-copper plating solution as that in Example 3 was used.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 1.0 μm. The underlying layer formed on the surface of the substrate of the tin-plated product was analyzed by the same method as that in Example 4. As a result, the underlying layer was formed of nickel, and the thickness of the underlying layer was 0.3 μm. The same sliding test as that in Example 1 was carried out. As a result, the substrate of each of the test pieces was not exposed even if the plate test piece was slid 100 reciprocating times or more. The electrical resistance value of the tin-plated product was measured by the same method as that in Example 1 when the test piece was slid 100 reciprocating times. As a result, the electrical resistance value of the tin-plated product was a low value of 4 mΩ. Furthermore, the electrical resistance value measured by the same method before the sliding test was 30 mΩ.

Example 7

A tin-plated product was produced by the same method as that in Example 4, except that, after the tin-copper plating layer was formed on the nickel plating layer by electroplating for 45 seconds so as to have a thickness of 2 μm, the tin-copper-plated substrate (the material to be plated) and a tin electrode plate were used as a cathode and an anode, respectively, to electroplate the substrate at a current density of 4 $A/dm^2$ and a liquid temperature of 25° C. for 10 seconds in a tin plating solution containing 60 g/L of tin sulfate and 75 g/L of sulfuric acid so as to form a tin plating layer having a thickness of 0.1 μm on the tin-copper plating layer, and then, washed with water and dried.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 2.2 μm. The underlying layer formed on the surface of the substrate of the tin-plated product was analyzed by the same method as that in Example 4. As a result, the underlying layer was formed of nickel, and the thickness of the underlying layer was 0.4 μm. The same sliding test as that in Example 1 was carried out. As a result, the substrate of each of the test pieces was not exposed even if the plate test piece was slid 100 reciprocating times or more. The electrical resistance value of the tin-plated product was measured by the same method as that in Example 1 when the test piece was slid 100 reciprocating times. As a result, the electrical resistance value of the tin-plated product was a low value of 2 mΩ. Furthermore, the electrical resistance value measured by the same method before the sliding test was 2 mΩ.

Example 8

A tin-plated product was produced by the same method as that in Example 7, except that the same tin-copper plating solution as that in Example 2 was used.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 2.1 μm. The underlying layer formed on the surface of the substrate of the tin-plated product was analyzed by the same method as that in Example 4. As a result, the underlying layer was formed of nickel, and the thickness of the underlying layer was 0.3 μm. The same sliding test as that in Example 1 was carried out. As a result, the substrate of each of the test pieces was not exposed even if the plate test piece was slid 100 reciprocating times or more. The electrical resistance value of the tin-plated product was measured by the same method as that in Example 1 when the test piece was slid 100 reciprocating times. As a result, the electrical resistance value of the tin-plated product was a low value of 1 mΩ. Furthermore, the electrical resistance value measured by the same method before the sliding test was 1 mΩ.

After carbon (C) was deposited on the outermost surface of the tin-plated product so as to have a thickness of about 1 μm, the tin-plated product was cut by a focused ion beam (FIB) to expose a cross-section perpendicular to the rolling direction of the tin-plated product. Then, the exposed cross-section was observed at a magnification of 5,000 by means of a scanning ion microscope (SIM) in ten areas of a field having a length L (=100 μm) parallel to the surface of the tin-plated product. Then, the total length (Lm) of the lengths of the tin-copper plating layers contacting the carbon-deposited layer in each of the observing areas was deducted from the length L (=100 μm) of the whole area to be divided by the length L of the whole area to obtain a value (a proportion (=(L−Lm)/L) of the length of tin layer contacting the carbon-deposited layer in the observing area). Then, the maximum and minimum values of the obtained values in the ten observing areas were omitted to obtain the average value of the obtained values in eight observing area. Then, the average value thus obtained was multiplied by 100 to be calculated as the area ratio of tin (the proportion of the area occupied by the tin layer in the outermost surface). As a result, the area ratio of tin was 37%.

Then, the same sliding test as that in Example 1 was carried out. As a result, the substrate of each of the test pieces was not exposed even if the plate test piece was slid 100 reciprocating times or more. The electrical resistance value of the tin-plated product was measured by the same method as that in Example 1 when the test piece was slid 100 reciprocating times. As a result, the electrical resistance value of the tin-plated product was a low value of 1 mΩ. Furthermore, the electrical resistance value measured by the same method before the sliding test was 1 mΩ.

After the same heat resistance test as that in Example 2 was carried out, the same sliding test as that in Example 1 was carried out. As a result, the substrate of each of the test pieces was not exposed even if the test piece was slid 100 reciprocating times or more. The electrical resistance value was measured by the same method as that in Example 1 when the test piece was slid 100 reciprocating times. As a result, the electrical resistance value was a low value of 5 m Ω. Furthermore, the electrical resistance value measured by the same method before the sliding test was 1 mΩ.

Example 9

A tin-plated product was produced by the same method as that in Example 7, except that the same tin-copper plating solution as that in Example 3 was used.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 2.0 μm. The underlying layer formed on the surface of the substrate of the tin-plated product was analyzed by the same method as that in Example 4. As a result, the underlying layer was formed of nickel, and the thickness of the underlying layer was 0.3 μm. The same sliding test as that in Example 1 was carried out. As a result, the substrate of each of the test pieces was not exposed even if the plate test piece was slid 100 reciprocating times or more. The electrical resistance value of the tin-plated product was measured by the same method as that in Example 1 when the test piece was slid 100 reciprocating times. As a result, the electrical resistance value of the tin-plated product was a low value of 3 mΩ. Furthermore, the electrical resistance value measured by the same method before the sliding test was 2 mΩ.

Example 10

A tin-plated product was produced by the same method as that in Example 2, except that the tin-copper plating layer was formed on the substrate by electroplating for 45 seconds so as to have a thickness of 2 μm.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 2.0 μm. The same sliding test as that in Example 1 was carried out. As a result, the substrate of each of the test pieces was not exposed even if the plate test piece was slid 100 reciprocating times or more. The electrical resistance value of the tin-plated product was measured by the same method as that in Example 1 when the test piece was slid 100 reciprocating times. As a result, the electrical resistance value of the tin-plated product was a low value of 1 mΩ. Furthermore, the electrical resistance value measured by the same method before the sliding test was 12 mΩ.

Example 11

A tin-plated product was produced by the same method as that in Example 2, except that the tin-copper plating layer was formed on the substrate by electroplating for 65 seconds so as to have a thickness of 3 μm.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 2.8 μm. The same sliding test as that in Example 1 was carried out. As a result, the substrate of each of the test pieces was not exposed even if the plate test piece was slid 100 reciprocating times or more. The electrical resistance value of the tin-plated product was measured by the same method as that in Example 1 when the test piece was slid 100 reciprocating times. As a result, the electrical resistance value of the tin-plated product was a low value of 1 mΩ. Furthermore, the electrical resistance value measured by the same method before the sliding test was 25 mΩ.

Example 12

A tin-plated product was produced by the same method as that in Example 2, except that the tin-copper plating layer was formed on the substrate by electroplating for 105 seconds so as to have a thickness of 5 μm.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 4.9 μm. The same sliding test as that in Example 1 was carried out. As a result, the substrate of each of the test pieces was not exposed even if the plate test piece was slid 100 reciprocating times or more. The electrical resistance value of the tin-plated product was measured by the same method as that in Example 1 when the test piece was slid 100 reciprocating times. As a result, the electrical resistance value of the tin-plated product was a low value of 1 mΩ. Furthermore, the electrical resistance value measured by the same method before the sliding test was 1 mΩ.

Example 13

A tin-plated product was produced by the same method as that in Example 5, except that the tin-copper plating layer was formed on the nickel plating layer by electroplating for 45 seconds so as to have a thickness of 2 μm.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 2.1 μm. The underlying layer formed on the surface of the substrate of the tin-plated product was analyzed by the same method as that in Example 4. As a result, the underlying layer was formed of nickel, and the thickness of the underlying layer was 0.3 μm. The same sliding test as that in Example 1 was carried out. As a result, the substrate of each of the test pieces was not exposed even if the plate test piece was slid 100 reciprocating times or more. The electrical resistance value of the tin-plated product was measured by the same method as that in Example 1 when the test piece was slid 100 reciprocating times. As a result, the electrical resistance value of the tin-plated product was a low value of 1 mΩ. Furthermore, the electrical resistance value measured by the same method before the sliding test was 2 mΩ.

Example 14

A tin-plated product was produced by the same method as that in Example 5, except that the tin-copper plating layer was formed on the nickel plating layer by electroplating for 105 seconds so as to have a thickness of 7 μm.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 6.8 μm. The underlying layer formed on the surface of the substrate of the tin-plated product was analyzed by the same method as that in Example 4. As a result, the underlying layer was formed of nickel, and the thickness of the underlying layer was 0.3 μm. The same sliding test as that in Example 1 was carried out. As a result, the substrate of each of the test pieces was not exposed even if the plate test piece was slid 100 reciprocating times or more. The electrical resistance value of the tin-plated product was measured by the same method as that in Example 1 when the test piece was slid 100 reciprocating times. As a result, the electrical resistance value of the tin-plated product was a low value of 2 mΩ. Furthermore, the electrical resistance value measured by the same method before the sliding test was 5 mΩ.

Example 15

A tin-plated product was produced by the same method as that in Example 5, except that, after the tin-copper plating layer was formed on the nickel plating layer by electroplating for 105 seconds so as to have a thickness of 7 μm, the tin-copper-plated substrate (the material to be plated) and a tin electrode plate were used as a cathode and an anode, respectively, to electroplate the substrate at a current density of 4 A/dm$^2$ and a liquid temperature of 25° C. for 10 seconds in a tin plating solution containing 60 g/L of tin sulfate and 75 g/L of sulfuric acid so as to form a tin plating layer having a thickness of 0.1 μm on the tin-copper plating layer, and then, washed with water and dried.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 7.3 μm. The underlying layer formed on the surface of the substrate of the tin-plated product was analyzed by the same method as that in Example 4. As a result, the underlying layer was formed of nickel, and the thickness of the underlying layer was 0.3 μm. The same sliding test as that in Example 1 was carried out. As a result, the substrate of each of the test pieces was not exposed even if the plate test piece was slid 100 reciprocating times or more. The electrical resistance value of the tin-plated product was measured by the same method as that in Example 1 when the test piece was slid 100 reciprocating times. As a result, the electrical resistance value of the tin-plated product was a low value of 1 mΩ. Furthermore, the electrical resistance value measured by the same method before the sliding test was 2 mΩ.

Example 16

A tin-plated product was produced by the same method as that in Example 5, except that the nickel plating layer was formed on the substrate by electroplating for 150 seconds so as to have a thickness of 1.0 μm.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 1.2 μm. The underlying layer formed on the surface of the substrate of the tin-plated product was analyzed by the same method as that in Example 4. As a result, the underlying layer was formed of nickel, and the thickness of the underlying layer was 0.9 μm. The same sliding test as that in Example 1 was carried out. As a result, the substrate of each of the test pieces was not exposed even if the plate test piece was slid 100 reciprocating times or more. The electrical resistance value of the tin-plated product was measured by the same method as that in Example 1 when the test piece was slid 100 reciprocating times. As a result, the electrical resistance value of the tin-plated product was a low value of 3 mΩ. Furthermore, the electrical resistance value measured by the same method before the sliding test was 23 mΩ.

Example 17

A tin-plated product was produced by the same method as that in Example 8, except that the nickel plating layer was formed on the substrate by electroplating for 150 seconds so as to have a thickness of 1.0 μm.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 2.2 μm. The underlying layer formed on the surface of the substrate of the tin-plated product was analyzed by the same method as that in Example 4. As a result, the underlying layer was formed of nickel, and the thickness of the underlying layer was 1.0 μm. The same sliding test as that in Example 1 was carried out. As a result, the substrate of each of the test pieces was not exposed even if the plate test piece was slid 100 reciprocating times or more. The electrical resistance value of the tin-plated product was measured by the same method as that in Example 1 when the test piece was slid 100 reciprocating times. As a result, the electrical resistance value of the tin-plated product was a low value of 2 mΩ. Furthermore, the electrical resistance value measured by the same method before the sliding test was 2 mΩ.

Example 18

A tin-plated product was produced by the same method as that in Example 8, except that the tin plating layer was formed on the tin-copper plating layer by electroplating for 5 seconds so as to have a thickness of 0.05 μm.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 1.9 μm. The underlying layer formed on the surface of the substrate of the tin-plated product was analyzed by the same method as that in Example 4. As a result, the underlying layer was formed of nickel, and the thickness of the underlying layer was 0.4 μm. The area ratio of tin was calculated by the same method as that in Example 8. As a result, the area ratio of tin was 12%. The same sliding test as that in Example 1 was carried out. As a result, the substrate of each of the test pieces was not exposed even if the plate test piece was slid 100 reciprocating times or more. The electrical resistance value of the tin-plated product was measured by the same method as that in Example 1 when the test piece was slid 100 reciprocating times. As a result, the electrical resistance value of the tin-plated product was a low value of 1 mΩ. Furthermore, the electrical resistance value measured by the same method before the sliding test was 2 mΩ.

After the same heat resistance test as that in Example 2 was carried out, the same sliding test as that in Example 1 was carried out. As a result, the substrate of each of the test pieces was not exposed even if the test piece was slid 100 reciprocating times or more. The electrical resistance value was measured by the same method as that in Example 1 when the test piece was slid 100 reciprocating times. As a result, the electrical resistance value was a low value of 4 m Ω. Furthermore, the electrical resistance value measured by the same method before the sliding test was 1 mΩ.

Example 19

A tin-plated product was produced by the same method as that in Example 8, except that the tin plating layer was formed on the tin-copper plating layer by electroplating for 25 seconds so as to have a thickness of 0.3 μm.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 1.9 μm. The underlying layer formed on the surface of the substrate of the tin-plated product was analyzed by the same method as that in Example 4. As a result, the underlying layer was formed of nickel, and the thickness of the underlying layer was 0.3 μm.

The area ratio of tin was calculated by the same method as that in Example 8. As a result, the area ratio of tin was 51%. The same sliding test as that in Example 1 was carried out. As a result, the substrate of each of the test pieces was not exposed even if the plate test piece was slid 100 reciprocating times or more. The electrical resistance value of the tin-plated product was measured by the same method as that in Example 1 when the test piece was slid 100 reciprocating times. As a result, the electrical resistance value of the tin-plated product was a low value of 3 mΩ. Furthermore, the electrical resistance value measured by the same method before the sliding test was 1 mΩ.

After the same heat resistance test as that in Example 2 was carried out, the same sliding test as that in Example 1 was carried out. As a result, the substrate of each of the test pieces was not exposed even if the test piece was slid 100 reciprocating times or more. The electrical resistance value was measured by the same method as that in Example 1 when the test piece was slid 100 reciprocating times. As a result, the electrical resistance value was 16 m Ω. Furthermore, the electrical resistance value measured by the same method before the sliding test was 1 mΩ.

Example 20

A tin-plated product was produced by the same method as that in Example 8, except that the tin plating layer was formed on the tin-copper plating layer by electroplating for 40 seconds so as to have a thickness of 0.5 μm.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 2.0 μm. The underlying layer formed on the surface of the substrate of the tin-plated product was analyzed by the same method as that in Example 4. As a result, the underlying layer was formed of nickel, and the thickness of the underlying layer was 0.3 μm. The area ratio of tin was calculated by the same method as that in Example 8. As a result, the area ratio of tin was 61%. The same sliding test as that in Example 1 was carried out. As a result, the substrate of each of the test pieces was not exposed even if the plate test piece was slid 100 reciprocating times or more. The electrical resistance value of the tin-plated product was measured by the same method as that in Example 1 when the test piece was slid 100 reciprocating times. As a result, the electrical resistance value of the tin-plated product was a low value of 3 mΩ. Furthermore, the electrical resistance value measured by the same method before the sliding test was 1 mΩ.

After the same heat resistance test as that in Example 2 was carried out, the same sliding test as that in Example 1 was carried out. As a result, the substrate of each of the test pieces was not exposed even if the test piece was slid 100 reciprocating times or more. The electrical resistance value was measured by the same method as that in Example 1 when the test piece was slid 100 reciprocating times. As a result, the electrical resistance value was 39 m Ω. Furthermore, the electrical resistance value measured by the same method before the sliding test was 1 mΩ.

Example 21

A tin-plated product was produced by the same method as that in Example 8, except that the tin plating layer was formed on the tin-copper plating layer by electroplating for 55 seconds so as to have a thickness of 0.7 μm.

With respect to the tin-plated product thus produced, the composition of the outermost layer thereof was analyzed by the same method as that in Example 1. As a result, it was confirmed that the outermost layer was formed of tin and that the layer under the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the layer under the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 2.0 μm. The underlying layer formed on the surface of the substrate of the tin-plated product was analyzed by the same method as that in Example 4. As a result, the underlying layer was formed of nickel, and the thickness of the underlying layer was 0.3 μm. The area ratio of tin was calculated by the same method as that in Example 8. As a result, the area ratio of tin was 100%. The same sliding test as that in Example 1 was carried out. As a result, the substrate of each of the test pieces was not exposed even if the plate test piece was slid 100 reciprocating times or more. The electrical resistance value of the tin-plated product was measured by the same method as that in Example 1 when the test piece was slid 100 reciprocating times. As a result, the electrical resistance value of the tin-plated product was a low value of 5 mΩ. Furthermore, the electrical resistance value measured by the same method before the sliding test was 1 mΩ.

After the same heat resistance test as that in Example 2 was carried out, the same sliding test as that in Example 1 was carried out. As a result, the substrate of each of the test pieces was not exposed even if the test piece was slid 100 reciprocating times or more. The electrical resistance value was measured by the same method as that in Example 1 when the test piece was slid 100 reciprocating times. As a result, the electrical resistance value was 77 m Ω. Furthermore, the electrical resistance value measured by the same method before the sliding test was 1 mΩ.

Comparative Example 1

A tin-plated product was produced by the same method as that in Example 1, except that a tin-copper plating solution containing 45 g/L of tin and 1.2 g/L of copper (the content of copper with respect to the total amount of tin and copper being 3% by weight) (1000 mL of a plating solution containing 120 mL of METASU AM, 225 mL of METASU SM-2, 12 mL of METASU CU, 100 mL of METASU FCB-71A and 20 mL of METASU FCB-71B, produced by YUKEN INDUSTRY CO., LTD., and the balance being pure water) was used as the tin-copper plating solution.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 1.0 μm. The content of copper in the tin-copper plating layer was measured by the same method as that in Example 1. As a result, the content of copper in the tin-copper plating layer was 4.7% by weight. The same sliding test as that in Example 1 was carried out. As a result, the substrate of one of the test pieces was exposed when the test piece was slid 67 reciprocating times. The electrical resistance value was measured by the same method as that in Example 1 when the test piece was exposed (when the test piece was slid 67 reciprocating times). As a result, the electrical resistance value was 4 mΩ. Furthermore, the electrical resistance value measured by the same method before the sliding test was 1 mΩ.

Comparative Example 2

A tin-plated product was produced by the same method as that in Example 1, except that a tin-copper plating solution containing 45 g/L of tin and 30 g/L of copper (the content of copper with respect to the total amount of tin and copper being 40% by weight) (1000 mL of a plating solution containing 120 mL of METASU AM, 225 mL of METASU SM-2, 300 mL of METASU CU, 100 mL of METASU FCB-71A and 20 mL of METASU FCB-71B, produced by YUKEN INDUSTRY CO., LTD., and the balance being pure water) was used as the tin-copper plating solution.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 1.4 μm. The content of copper in the tin-copper plating layer was measured by the same method as that in Example 1. As a result, the content of copper in the tin-copper plating layer was 37.6% by weight. The same sliding test as that in Example 1 was carried out. As a result, the substrate of one of the test pieces was exposed when the test piece was slid 71 reciprocating times. The electrical resistance value was measured by the same method as that in Example 1 when the test piece was exposed (when the test piece was slid 71 reciprocating times). As a result, the electrical resistance value was 9 mΩ. Furthermore, the electrical resistance value measured by the same method before the sliding test was 89 mΩ.

Comparative Example 3

A tin-plated product was produced by the same method as that in Example 1, except that a tin-copper plating solution containing 45 g/L of tin and 45 g/L of copper (the content of copper with respect to the total amount of tin and copper being 50% by weight) (1000 mL of a plating solution containing 120 mL of METASU AM, 225 mL of METASU SM-2, 450 mL of METASU CU, 100 mL of METASU FCB-71A and 20 mL of METASU FCB-71B, produced by YUKEN INDUSTRY CO., LTD., and the balance being pure water) was used as the tin-copper plating solution.

With respect to the tin-plated product thus produced, the composition of the outermost layer thereof was analyzed by the same method as that in Example 1. As a result, it was confirmed that the outermost layer was formed of $Cu_6Sn_5$ (copper-tin alloy) so that a tin-copper alloy layer exists on the outermost surface. It was also confirmed from the SIM image of the cross-section of the tin-plated product by the same method as that in Example 1 that the outermost layer was a tin-copper alloy layer. The thickness of the tin-copper plating layer was measured from the SIM image of the cross-section of the tin-plated product by the same method as that in Example 1. As a result, the thickness of the tin-copper plating layer was 1.9 μm. The same sliding test as that in Example 1 was carried out. As a result, the substrate of one of the test pieces was exposed when the test piece was slid 89 reciprocating times. The electrical resistance value was measured by the same method as that in Example 1 when the test piece was exposed (when the test piece was slid 89 reciprocating times). As a result, the electrical resistance value was 180 mΩ. Furthermore, the electrical resistance value measured by the same method before the sliding test was 200 mΩ.

Comparative Example 4

A tin-plated product was produced by the same method as that in Example 2, except that the tin-copper plating layer was formed on the nickel plating layer by electroplating for 14 seconds so as to have a thickness of 0.5 μm.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 0.5 μm. The same sliding test as that in Example 1 was carried out. As a result, the substrate of one of the test pieces was exposed when the test piece was slid 46 reciprocating times. The electrical resistance value was measured by the same method as that in Example 1 when the test piece was exposed (when the test piece was slid 46 reciprocating times). As a result, the electrical resistance value was 2 mΩ. Furthermore, the electrical resistance value measured by the same method before the sliding test was 20 mΩ.

Comparative Example 5

A tin-plated product was produced by the same method as that in Example 5, except that the tin-copper plating layer was formed on the nickel plating layer by electroplating for 14 seconds so as to have a thickness of 0.5 μm.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 0.5 μm. The underlying layer formed on the surface of the substrate of the tin-plated product was analyzed by the same method as that in Example 4. As a result, the underlying layer was formed of nickel, and the thickness of the underlying layer was 0.4 μm. The same sliding test as that in Example 1 was carried out. As a result, the substrate of one of the test pieces was exposed when the test piece was slid 66 reciprocating times. The electrical resistance value was measured by the same method as that in Example 1 when the test piece was exposed (when the test piece was slid 66 reciprocating times). As a result, the electrical resistance value was 3 mΩ. Furthermore, the electrical resistance value measured by the same method before the sliding test was 4 mΩ.

Comparative Example 6

A tin-plated product was produced by the same method as that in Example 8, except that the tin-copper plating layer was formed on the nickel plating layer by electroplating for 14 seconds so as to have a thickness of 0.5 μm.

With respect to the tin-plated product thus produced, the composition of the outermost layer thereof was analyzed by the same method as that in Example 1. As a result, it was confirmed that the outermost layer was composed of Sn and $Cu_6Sn_5$ (copper-tin alloy) and was a tin-copper plating layer containing tin mixed with a copper-tin alloy. It was also confirmed from the SIM image of the cross-section of the tin-plated product by the same method as that in Example 1 that the outermost layer was a tin-copper plating layer containing tin mixed with a copper-tin alloy. The thickness of the tin-copper plating layer was measured from the SIM image of the cross-section of the tin-plated product by the same method as that in Example 1. As a result, the thickness of the tin-copper plating layer was 1.1 μm. The underlying layer formed on the surface of the substrate of the tin-plated product was analyzed by the same method as that in Example 4. As a result, the underlying layer was formed of nickel, and the thickness of the underlying layer was 0.4 μm. The same sliding test as that in Example 1 was carried out. As a result, the substrate of one of the test pieces was exposed when the test piece was slid 93 reciprocating times. The electrical resistance value was measured by the same method as that in Example 1 when the test piece was exposed (when the test piece was slid 93 reciprocating times). As a result, the electrical resistance value was 8 mΩ. Furthermore, the electrical resistance value measured by the same method before the sliding test was 1 mΩ.

Comparative Example 7

First, a strip-shaped conductive substrate of a Cu—Ni—Sn—P alloy (a substrate of a copper alloy comprising 1.0% by weight of nickel, 0.9% by weight of tin, 0.05% by weight of phosphorus and the balance being copper) (NB-109EH produced by DOWA METALTECH CO., LTD.) having a thickness of 0.25 mm and a width of 250 mm was prepared and installed on a real machine (a continuous plating line of a reel-to-reel system for continuously carrying out plating treatments).

In this continuous plating line, as a pretreatment, the substrate (a material to be plated) was electrolytic-degreased for 20 seconds with an alkali electrolytic-degreasing solution, and then, washed with water for 5 seconds. Thereafter, the substrate was immersed in 4% by weight of sulfuric acid for 5 seconds to be pickled, and then, washed with water for 5 seconds. Thereafter, the substrate (the material to be plated), which was pretreated by the same method as that in Example 1, and a tin electrode plate were used as a cathode and an anode, respectively, to electroplate the substrate at a current density of 5 $A/dm^2$ and a liquid temperature of 25° C. for 20 seconds in a tin plating solution containing 60 g/L of tin sulfate and 75 g/L of sulfuric acid so as to form a tin plating layer having a thickness of 1.0 μm on the substrate. Then, the substrate having the tin plating layer was washed with water, and then, dried. Thereafter, the substrate having the tin plating layer was put in a reflow furnace, and a heat treatment for holding the substrate at a furnace temperature of 700° C. for 6.5 seconds was carried out in the atmosphere.

With respect to the tin-plated product thus produced, the composition of the outermost layer thereof was analyzed by the same method as that in Example 1. As a result, it was confirmed that the outermost layer was formed of Sn and that a layer of a copper-tin alloy, not a tin-copper plating layer containing tin mixed with a copper-tin alloy, was formed between the outermost layer and the substrate. The thickness of each of these layers was measured by means of an electrolytic film thickness meter. As a result, the thickness of the tin layer was 1.0 μm, and the thickness of the copper-tin alloy layer was 0.6 μm. The same sliding test as that in Example 1 was carried out. As a result, the substrate of one of the test pieces was exposed when the test piece was slid 34 reciprocating times. The electrical resistance value was measured by the same method as that in Example 1 when the test piece was exposed (when the test piece was slid 34 reciprocating times). As a result, the electrical resistance value was 38 mΩ. Furthermore, the electrical resistance value measured by the same method before the sliding test was 1 mΩ.

Comparative Example 8

After the substrate (the material to be plated) was pretreated by the same method as that in Comparative Example 7, the substrate (the material to be plated) and a nickel electrode plate were used as a cathode and an anode, respectively, to electroplate the substrate at a current density of 5 $A/dm^2$ and a liquid temperature of 50° C. for 15 seconds in a nickel plating solution containing 80 g/L of nickel sulfamate and 45 g/L of boric acid so as to form a nickel plating layer having a thickness of 0.3 μm on the substrate, and then, washed with water and dried.

Then, the nickel-plated substrate (the material to be plated) and a copper electrode plate were used as a cathode and an anode, respectively, to electroplate the substrate at a current density of 5 $A/dm^2$ and a liquid temperature of 30° C. for 12 seconds in a copper plating solution containing 110 g/L of copper sulfate and 100 g/L of sulfuric acid so as to form a copper plating layer having a thickness of 0.3 μm on the nickel plating layer, and then, washed with water and dried.

Then, the copper-plate substrate (the material to be plated) and a tin electrode plate were used as a cathode and an anode, respectively, to electroplate the substrate at a current density of 5 A/dm$^2$ and a liquid temperature of 25° C. for 14 seconds in a tin plating solution containing 60 g/L of tin sulfate and 75 g/L of sulfuric acid so as to form a tin plating layer having a thickness of 0.7 μm on the substrate. Then, the substrate having the tin plating layer was washed with water, and then, dried. Thereafter, the substrate having the tin plating layer was put in a reflow furnace, and a heat treatment for holding the substrate at a furnace temperature of 700° C. for 6.5 seconds was carried out in the atmosphere.

With respect to the tin-plated product thus produced, the composition of the outermost layer thereof was analyzed by the same method as that in Example 1. As a result, it was confirmed that the outermost layer was formed of Sn and that a layer of a copper-tin alloy, not a tin-copper plating layer containing tin mixed with a copper-tin alloy, was formed between the outermost layer and the underlying layer. The thickness of each of these layers was measured by means of an electrolytic film thickness meter. As a result, the thickness of the tin layer was 0.68 μm, and the thickness of the copper-tin alloy layer was 0.7 μm. The underlying layer formed on the surface of the substrate of the tin-plated product was analyzed by the same method as that in Example 4. As a result, the underlying layer was formed of nickel, and the thickness of the underlying layer was 0.3 μm. The same sliding test as that in Example 1 was carried out. As a result, the substrate of one of the test pieces was exposed when the test piece was slid 34 reciprocating times. The electrical resistance value was measured by the same method as that in Example 1 when the test piece was exposed (when the test piece was slid 34 reciprocating times). As a result, the electrical resistance value was 87 mΩ. Furthermore, the electrical resistance value measured by the same method before the sliding test was 1 mΩ.

Comparative Example 9

After the substrate (the material to be plated) was pretreated by the same method as that in Comparative Example 7, the substrate (the material to be plated) and a nickel electrode plate were used as a cathode and an anode, respectively, to electroplate the substrate at a current density of 5 A/dm$^2$ and a liquid temperature of 50° C. for 5 seconds in a nickel plating solution containing 80 g/L of nickel sulfamate and 45 g/L of boric acid so as to form a nickel plating layer having a thickness of 0.1 μm on the substrate, and then, washed with water and dried.

Then, the nickel-plated substrate (the material to be plated) and a copper electrode plate were used as a cathode and an anode, respectively, to electroplate the substrate at a current density of 5 A/dm$^2$ and a liquid temperature of 30° C. for 16 seconds in a copper plating solution containing 110 g/L of copper sulfate and 100 g/L of sulfuric acid so as to form a copper plating layer having a thickness of 0.4 μm on the nickel plating layer, and then, washed with water and dried.

Then, the copper-plated substrate (the material to be plated) and a tin electrode plate were used as a cathode and an anode, respectively, to electroplate the substrate at a current density of 5 A/dm$^2$ and a liquid temperature of 25° C. for 20 seconds in a tin plating solution containing 60 g/L of tin sulfate and 75 g/L of sulfuric acid so as to form a tin plating layer having a thickness of 1.0 μm on the substrate. Then, the substrate having the tin plating layer was washed with water, and then, dried. Thereafter, the substrate having the tin plating layer was put in a bright annealing furnace (produced by KOYO LINDBERG CO., LTD.), and a heat treatment for holding the substrate at a furnace temperature of 400° C. for 135 seconds was carried out in a reducing atmosphere.

With respect to the tin-plated product thus produced, the composition of the outermost layer thereof was analyzed by the same method as that in Example 1. As a result, it was confirmed that the outermost layer was formed of Sn and that a layer of a copper-tin alloy, not a tin-copper plating layer containing tin mixed with a copper-tin alloy, was formed between the outermost layer and the underlying layer. The thickness of each of these layers was measured by means of an electrolytic film thickness meter. As a result, the thickness of the tin layer was 0.2 μm, and the thickness of the copper-tin alloy layer was 0.9 μm. The underlying layer formed on the surface of the substrate of the tin-plated product was analyzed by the same method as that in Example 4. As a result, the underlying layer was formed of nickel, and the thickness of the underlying layer was 0.1 μm. The same sliding test as that in Example 1 was carried out. As a result, the substrate of each of the test pieces was not exposed even if the plate test piece was slid 100 reciprocating times or more. The electrical resistance value of the tin-plated product was measured by the same method as that in Example 1 when the test piece was slid 100 reciprocating times. As a result, the electrical resistance value of the tin-plated product was 76 mΩ. Furthermore, the electrical resistance value measured by the same method before the sliding test was 2 mΩ.

The producing conditions and characteristics of the tin-plated products in these Examples and Comparative Examples are shown in Tables 1-1 through 3.

TABLE 1-1

| | Content of Cu in Sn—Cu Plating Bath (wt %) | Thickness of Plating Film (μm) | | | | Heat |
|---|---|---|---|---|---|---|
| | | Cu—Sn | Sn | Cu | Ni | Treatment |
| Ex. 1 | 10 | 1 | — | — | — | — |
| Ex. 2 | 20 | 1 | — | — | — | — |
| Ex. 3 | 30 | 1 | — | — | — | — |
| Ex. 4 | 10 | 1 | — | — | 0.3 | — |
| Ex. 5 | 20 | 1 | — | — | 0.3 | — |
| Ex. 6 | 30 | 1 | — | — | 0.3 | — |
| Ex. 7 | 10 | 2 | 0.1 | — | 0.4 | — |
| Ex. 8 | 20 | 2 | 0.1 | — | 0.3 | — |
| Ex. 9 | 30 | 2 | 0.1 | — | 0.3 | — |
| Ex. 10 | 20 | 2 | — | — | — | — |
| Ex. 11 | 20 | 3 | — | — | — | — |
| Ex. 12 | 20 | 5 | — | — | — | — |
| Ex. 13 | 20 | 2 | — | — | 0.3 | — |
| Ex. 14 | 20 | 7 | — | — | 0.3 | — |
| Ex. 15 | 20 | 7 | 0.1 | — | 0.3 | — |
| Ex. 16 | 20 | 1 | — | — | 0.9 | — |
| Ex. 17 | 20 | 2 | 0.1 | — | 1.0 | — |
| Ex. 18 | 20 | 2 | 0.05 | — | 0.4 | — |
| Ex. 19 | 20 | 2 | 0.3 | — | 0.3 | — |
| Ex. 20 | 20 | 2 | 0.5 | — | 0.3 | — |
| Ex. 21 | 20 | 2 | 0.7 | | 0.3 | — |

TABLE 1-2

| | Content of Cu in Sn—Cu Plating Bath (wt %) | Thickness of Plating Film (μm) Cu—Sn | Sn | Cu | Ni | Heat Treatment |
|---|---|---|---|---|---|---|
| Comp. 1 | 3 | 1 | — | — | — | — |
| Comp. 2 | 40 | 1 | — | — | — | — |
| Comp. 3 | 50 | 1 | — | — | — | — |
| Comp. 4 | 20 | 0.5 | — | — | — | — |
| Comp. 5 | 20 | 0.5 | — | — | 0.4 | — |
| Comp. 6 | 20 | 0.5 | 0.1 | — | 0.4 | — |
| Comp. 7 | — | — | 1.0 | — | — | Reflow |
| Comp. 8 | — | — | 0.7 | 0.3 | 0.3 | Reflow |
| Comp. 9 | — | — | 1.0 | 0.4 | 0.1 | Bright Annealing Furnace |

TABLE 3

| | Minute Sliding Abrasion Property After Heat Resistance Test (120° C., 120 h) Sliding Times (Times) | Resistance Value (mΩ) | Initial Resistance Value (mΩ) |
|---|---|---|---|
| Ex. 2 | 51 | 190 | >200 |
| Ex. 5 | >100 | 8 | 5 |
| Ex. 8 | >100 | 5 | 1 |
| Ex. 18 | >100 | 4 | 1 |
| Ex. 19 | >100 | 16 | 1 |
| Ex. 20 | >100 | 39 | 1 |
| Ex. 21 | >100 | 77 | 1 |

TABLE 2-1

| | Composition of Outermost Layer | Thickness of Sn—Cu Plating Layer (μm) | Area Ratio of Sn Layer on Outermost Layer (%) | Content of Cu in Sn—Cu Plating Layer (wt %) | Minute Sliding Abrasion Property Sliding Times (Times) | Resistance Value (mΩ) | Initial Resistance Value (mΩ) |
|---|---|---|---|---|---|---|---|
| Ex. 1 | Sn + $Cu_6Sn_5$ | 1.1 | | 11.6 | >100 | 2 | 2 |
| Ex. 2 | Sn + $Cu_6Sn_5$ | 1.1 | | 23.9 | >100 | 2 | 15 |
| Ex. 3 | Sn + $Cu_6Sn_5$ | 1.2 | | 31.1 | >100 | 4 | 93 |
| Ex. 4 | Sn + $Cu_6Sn_5$ | 1.0 | | | >100 | 2 | 2 |
| Ex. 5 | Sn + $Cu_6Sn_5$ | 1.2 | | | >100 | 3 | 7 |
| Ex. 6 | Sn + $Cu_6Sn_5$ | 1.0 | | | >100 | 4 | 30 |
| Ex. 7 | Sn + $Cu_6Sn_5$ | 2.2 | | | >100 | 2 | 2 |
| Ex. 8 | Sn + $Cu_6Sn_5$ | 2.1 | 37 | | >100 | 1 | 1 |
| Ex. 9 | Sn + $Cu_6Sn_5$ | 2.0 | | | >100 | 3 | 2 |
| Ex. 10 | Sn + $Cu_6Sn_5$ | 2.0 | | | >100 | 1 | 12 |
| Ex. 11 | Sn + $Cu_6Sn_5$ | 2.8 | | | >100 | 1 | 25 |
| Ex. 12 | Sn + $Cu_6Sn_5$ | 4.9 | | | >100 | 1 | 1 |
| Ex. 13 | Sn + $Cu_6Sn_5$ | 2.2 | | | >100 | 1 | 2 |
| Ex. 14 | Sn + $Cu_6Sn_5$ | 6.8 | | | >100 | 2 | 5 |
| Ex. 15 | Sn + $Cu_6Sn_5$ | 7.3 | | | >100 | 1 | 2 |
| Ex. 16 | Sn + $Cu_6Sn_5$ | 1.2 | | | >100 | 3 | 23 |
| Ex. 17 | Sn + $Cu_6Sn_5$ | 2.2 | | | >100 | 2 | 2 |
| Ex. 18 | Sn + $Cu_6Sn_5$ | 1.9 | 12 | | >100 | 1 | 2 |
| Ex. 19 | Sn + $Cu_6Sn_5$ | 1.9 | 51 | | >100 | 3 | 1 |
| Ex. 20 | Sn + $Cu_6Sn_5$ | 2.0 | 61 | | >100 | 3 | 1 |
| Ex. 21 | Sn | 2.0 | 100 | | >100 | 5 | 1 |

TABLE 2-2

| | Composition of Outermost Layer | Thickness of Sn—Cu Plating Layer (μm) | Area Ratio of Sn Layer on Outermost Layer (%) | Content of Cu in Sn—Cu Plating Layer (wt %) | Minute Sliding Abrasion Property Sliding Times (Times) | Resistance Value (mΩ) | Initial Resistance Value (mΩ) |
|---|---|---|---|---|---|---|---|
| Comp. 1 | Sn + $Cu_6Sn_5$ | 1.0 | | 4.7 | 67 | 4 | 1 |
| Comp. 2 | Sn + $Cu_6Sn_5$ | 1.4 | | 37.6 | 71 | 9 | 89 |
| Comp. 3 | $Cu_6Sn_5$ | 1.9 | | | 89 | 180 | >200 |
| Comp. 4 | Sn + $Cu_6Sn_5$ | 1.9 | | | 46 | 2 | 20 |
| Comp. 5 | Sn + $Cu_6Sn_5$ | 0.5 | | | 66 | 3 | 4 |
| Comp. 6 | Sn + $Cu_6Sn_5$ | 0.5 | | | 93 | 8 | 1 |
| Comp. 7 | Sn | 0 | | | 34 | 38 | 1 |
| Comp. 8 | Sn | 0 | | | 34 | 87 | 1 |
| Comp. 9 | Sn | 0 | | | >100 | 76 | 2 |

DESCRIPTION OF REFERENCE NUMBERS

10 Substrate
12 Tin-Copper Plating Layer
12*a* Copper-Tin Alloy
12*b* Tin
14 Tin Layer
16 Nickel Layer

The invention claimed is:

1. A tin-plated product comprising:
a substrate of copper or a copper alloy; and
a tin-copper plating layer formed on the substrate, the tin-copper plating layer containing a plurality of discontinuous portions of tin spaced from each other in a layer of a copper-tin alloy of $Cu_6Sn_5$, and the tin-copper plating layer having a thickness of 0.6 to 10 μm,
wherein the content of copper in the tin-copper plating layer is 5 to 35% by weight.

2. A tin-plated product as set forth in claim 1, which further comprises a tin layer formed on said tin-copper plating layer, the tin layer having a thickness of 1 μm or less.

3. A tin-plated product as set forth in claim 1, which further comprises a nickel layer formed between said substrate and said tin-copper plating layer, the nickel layer having a thickness of 0.1 to 1.5 μm.

4. A tin-plated product comprising:
a substrate of copper or a copper alloy;
a tin-copper plating layer formed on the substrate, the tin-copper plating layer containing a plurality of discontinuous portions of tin spaced from each other in a layer of a copper-tin alloy, and the tin-copper plating layer having a thickness of 0.6 to 10 μm; and
a tin layer formed on the tin-copper plating layer, the tin layer having a thickness of 1 μm or less,
wherein the content of copper in the tin-copper plating layer is 5 to 35% by weight.

5. A tin-plated product as set forth in claim 4, which further comprises a nickel layer formed between said substrate and said tin-copper plating layer, the nickel layer having a thickness of 0.1 to 1.5 μm.

* * * * *